United States Patent [19]
Vandenberg

[11] Patent Number: 5,494,435
[45] Date of Patent: Feb. 27, 1996

[54] POSITIVE INTERNAL LATCH LOCK FOR AN INJECTION MOLD

[75] Inventor: Leo A. Vandenberg, Lake Zurich, Ill.

[73] Assignee: D-M-E Company, Div. of Fairchild Industries, Inc., Madison Heights, Mich.

[21] Appl. No.: 303,764

[22] Filed: Sep. 9, 1994

[51] Int. Cl.⁶ .................................................. B29C 45/64
[52] U.S. Cl. .................. 425/589; 425/450.1; 425/451.9; 425/595
[58] Field of Search .............................. 425/190, 192 R, 425/589, 595, 450.1, 451.9

[56] References Cited

U.S. PATENT DOCUMENTS

| | | | |
|---|---|---|---|
| 3,986,805 | 10/1976 | Haines | 425/590 |
| 4,636,167 | 1/1987 | Shibata | 425/589 |
| 4,671,764 | 6/1987 | Hehl | 425/595 |
| 4,859,170 | 8/1989 | Aoki | 425/450.1 |
| 4,881,891 | 11/1989 | Luther | 425/556 |
| 5,198,249 | 3/1993 | Westerkamp | 425/589 |

*Primary Examiner*—James P. Mackey
*Attorney, Agent, or Firm*—Henderson & Sturm

[57] ABSTRACT

A positive internal latch lock for an injection mold having outer, intermediate, and inner plates movable between open and closed mold positions. The latch lock includes a mechanism for securing the outer and intermediate plates at a predetermined spaced distance when the mold is opened at a first parting line between the outer and intermediate plates. Further, the latch lock provides a mechanism for locking the intermediate and inner plates together until the outer and intermediate plates are secured at the predetermined spaced distance. After the outer and intermediate plates are secured, the intermediate and inner plates are allowed to open at a second parting line.

7 Claims, 6 Drawing Sheets

POSITIVE INTERNAL LATCH LOCK FOR AN INJECTION MOLD

TECHNICAL FIELD

This invention relates to injection molding apparatus, and more particularly to a positive internal latch lock for an injection mold.

BACKGROUND ART

In injection molds that include multiple plates, all plates tend to open at the same time when the mold is opened. Latch locks are used to hold some mold plates closed while other mold plates are allowed to open. Known latch locks are mounted on the exterior part of the mold at the bottom. These latch locks are very time consuming to install since they include numerous components. Also, since the latch lock is located at the bottom side of the mold, the mechanism lies directly in the path of parts being discharged from the mold.

Those concerned with these and other problems recognize the need for an improved latch lock for an injection mold.

DISCLOSURE OF THE INVENTION

The present invention provides a positive internal latch lock for an injection mold having outer, intermediate, and inner plates movable between open and closed mold positions. The latch lock includes a mechanism for securing the outer and intermediate plates at a predetermined spaced distance when the mold is opened at a first parting line between the outer and intermediate plates. Further, the latch lock provides a mechanism for locking the intermediate and inner plates together until the outer and intermediate plates are secured at the predetermined spaced distance. After the outer and intermediate plates are secured, the intermediate and inner plates are allowed to open at a second parting line.

An object of the present invention is the provision of an improved latch lock for an injection mold.

Another object is to provide a latch lock that is disposed internally of the mold.

Other objects, advantages and novel features of the present invention will become apparent from the following detailed description of the invention when considered in conjunction with the accompanying drawings.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
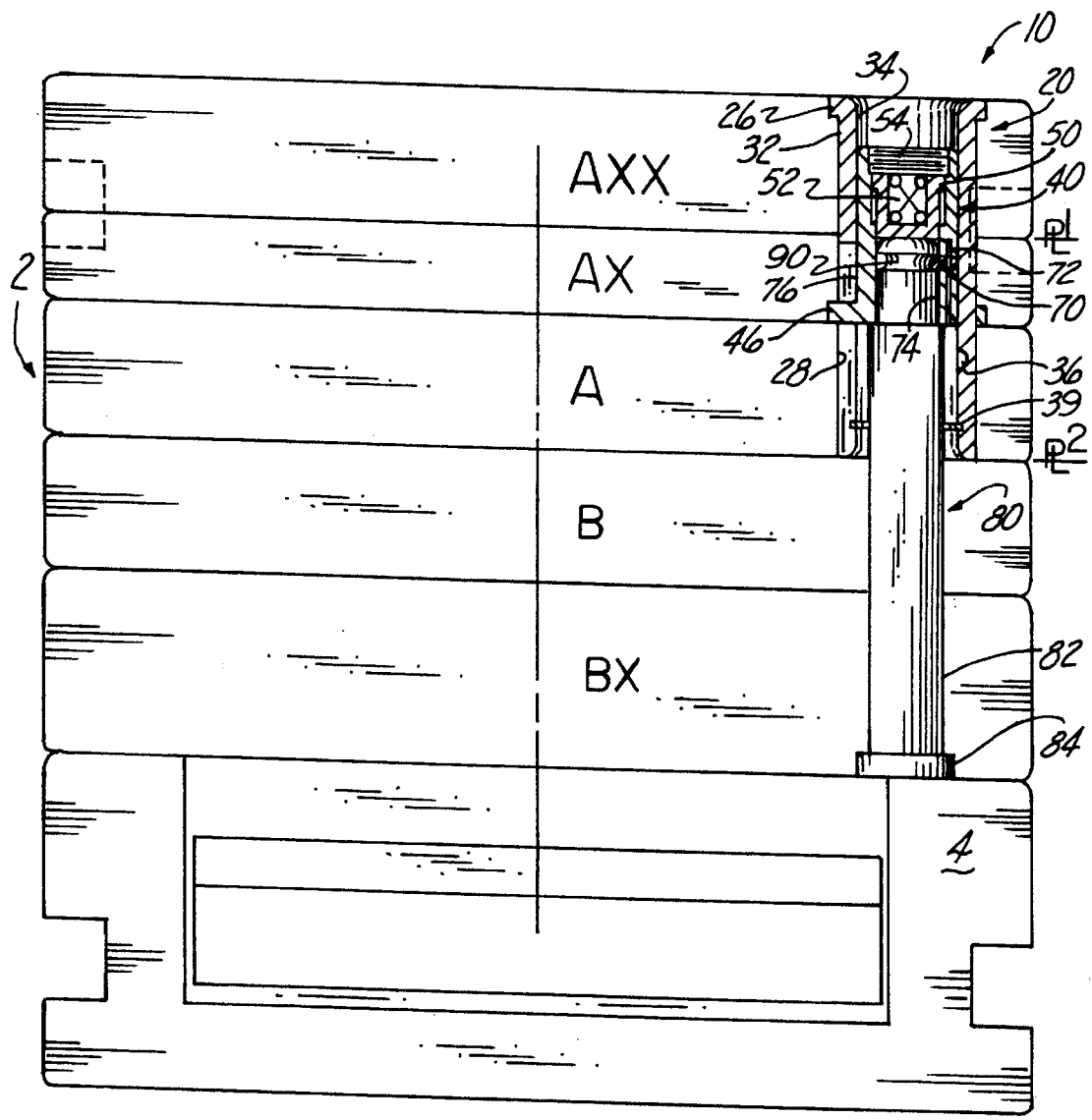
FIG. 1 is a sectional view showing the internal latch lock of the present invention where the multi-plate mold is in the closed position.

Referring now to the drawings, wherein like reference numerals designate identical or corresponding parts throughout the several views, FIGS. 1–5 show the internal latch lock (10) of the present invention used in a multi-plate mold (2). the mold (2) includes a number of plates designated A, AX, AXX, B and BX secured and aligned together with an ejector housing (4) by the tie rods (not shown). For purposes of this disclosure plate AXX will be referred to as the outer plate, plates A and AX and will be collectively referred to as the intermediate plate, and plates B and BX will be collectively referred to as the inner plate. Although, it is anticipated that two latch locks (10) will be used on each mold (2), only one latch lock (10) is shown in FIGS. 1–5 for purposes of clarity.

Figure 6:
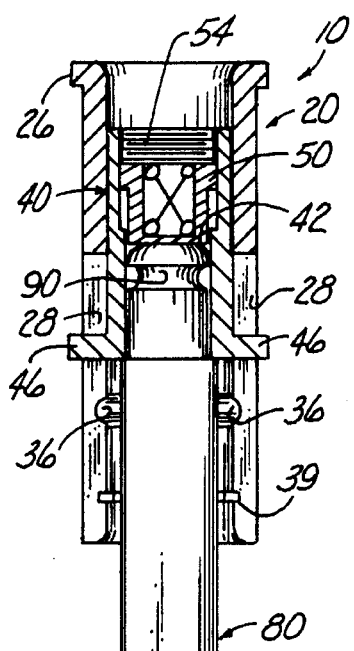
FIG. 6 is a sectional view of the latch lock isolated from the mold to better illustrate the components, the latch lock being in the closed mold position illustrated in FIG. 1.

FIG. 6 shows the latch lock (10) isolated from the mold (2). The latch lock (10) includes three main components: the travel bushing (20). the cam retainer (40), and the travel pin (80).

Figure 7:
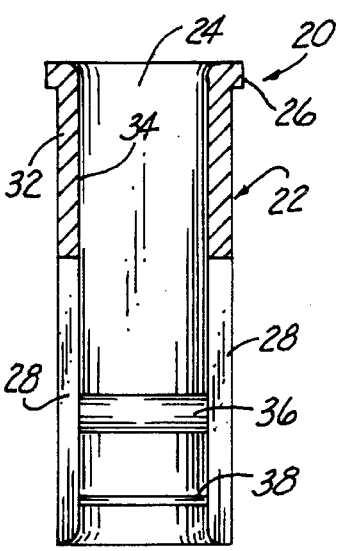
FIG. 7 is a sectional view of the travel bushing shown in the same orientation as the depicted in FIGS. 1–6.
Figure 8:
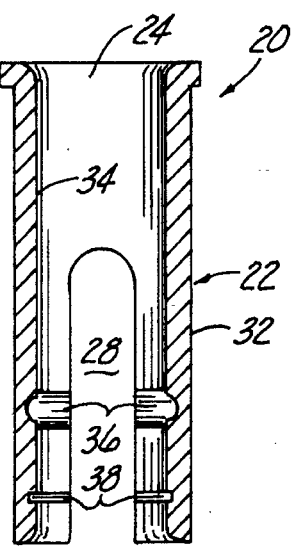
FIG. 8 is a sectional view of the travel bushing in a position rotated 90° from the FIG. 7 position.
Figure 9:
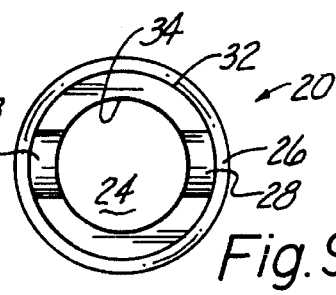
FIG. 9 is a bottom plan view of the travel bushing.

As best shown in FIGS. 7–9, the travel bushing (20) includes a generally cylindrical body (22) having an internal cavity (24). A top portion (26) is flared outwardly and a pair of elongated opposing slots (28) extend up from the bottom. The external wall (32) is received in a bore in the outer plate (AXX) and the intermediate plate (A-AX), and is secured to the outer plate (AXX) by means such as press-fitting (FIGS. 1–5). The internal wall (34) includes a rounded undercut area (36) and a groove (38).

Referring now to FIGS. 6 and 10–12, the cam retainer (40) includes a generally cylindrical body (42) having an internal chamber (44). A pair of tabs (46) extend out from the bottom, and an internal threaded area (48) is formed in the top. A spring retainer (50) is received in the upper enlarged section of the internal chamber (44) (FIG. 6), and a medium pressure round wire spring (52) is held within the spring retainer (50) by engagement of a set screw (54) with threaded area (48). The spring retainer (50) is movable between the full-up position shown in FIGS. 1–2 and 5–6, and the full-down position shown in FIGS. 3–4.

In the lower section of the internal chamber (44), a pair of opposing openings (60) are formed through the body (42). Small bores (62) extend up from the bottom of the body (42) in intersect the openings (60). As best shown in FIGS. 1–5, the openings (60) receive cam fingers (70), and a central opening in the cam fingers (70) receives a roll pin (72) inserted through the small bores (62) to hold the cam fingers (70) in the openings (60). The cam fingers (70) are movable to selectively extend either interior of the internal wall (74) or exterior of the external wall (76) of the cam retainer (40).

The internal wall (34) of the travel bushing (20) telescopically receives the external wall (76) of the cam retainer (40). The tabs (46) extend through the slots (28) beyond the external wall (32). The cam retainer (40) is movable within the travel bushing (20) between a retracted closed mold position (FIGS. 1 and 6) and an extended open mold position (FIGS. 2–5). In the extended open mold position, the cam retainer (40) is held within the travel bushing (20) by an engagement with a snap ring (39) positioned within groove (38). Also, in this position the cam fingers (70) are aligned with the undercut area (36) in the travel bushing (20). Although the cam retainer (40) is movable with respect to the travel bushing (20), it is secured against movement with respect to the intermediate plate (A-AX) by engagement of the ends of the tabs (46) between plates A and AX. Thus, as the outer plate (AXX) moves with respect to the intermediate plate (A-AX), the corresponding movement of the cam retainer (40) in the travel bushing (20) occurs.

Figure 13:
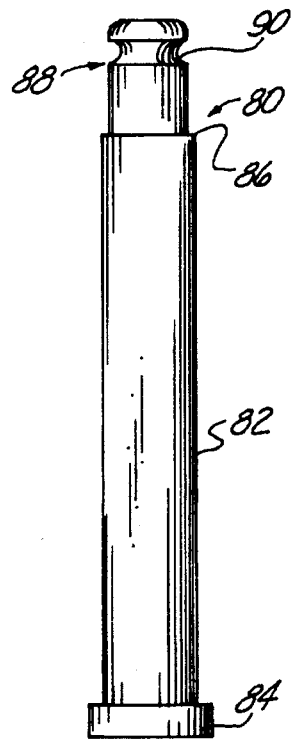
FIG. 13 is a side elevational view of the travel pin.
Figure 10:
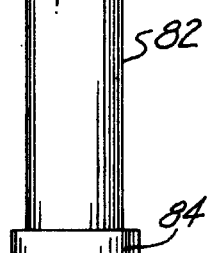
FIG. 10 is a sectional view of the cam retainer shown in the same orientation as that depicted in FIGS. 1–6.
Figure 11:
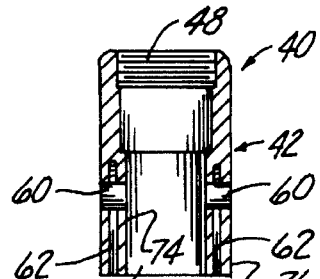
FIG. 11 is a sectional view of the cam retainer in a position rotated 90° from the FIG. 10 position.
Figure 12:
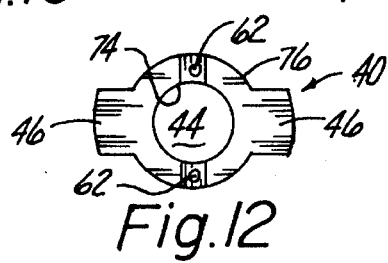
FIG. 12 is a bottom plan view of the cam retainer.

As most clearly shown in FIG. 13, the travel pin (80) includes an elongated body section (82) with a flanged end (84). The body section (82) has a diameter slightly larger than the diameter of the lower section of the cam retainer internal chamber (44). A shoulder (86) defines a transition point to a reduced end portion including a free end (88) having an undercut area (90). The free end (88) is selectively received in the lower section of the cam retainer (40) to a point where the shoulder (86) abuts the lower portion of the body (42). At this position, the undercut area (90) of the travel pin (80) is aligned with the cam fingers (70). The travel pin (80) is received within a bore and counterbore in the inner plate (B-BX) and secured against movement with respect thereto by the engagement of the flanged end (84) between plate (BX) and the ejector housing (4).

Referring to FIGS. 1–5, the installation and operation of the latch lock (10) of the present invention is best understood. Only circular bores and counterbores in the mold plates are required for installation. The travel bushing (20) is secured to the outer plate (AXX), the cam retainer (40) is secured to the intermediate plate (A-AX), and the travel pin (80) is secured to the inner plate (B-BX).

In the closed mold position (FIG. 1), the intermediate plate (A-AX) and the inner plate (B-BX) are locked together. One end of the cam finger (70) is engaged in the undercut area (90) of the travel pin (80) while the other end contacts the internal wall (34) of the travel bushing (20) which prevents the cam finger (70) from disengaging from the undercut area (90).

Figure 2:
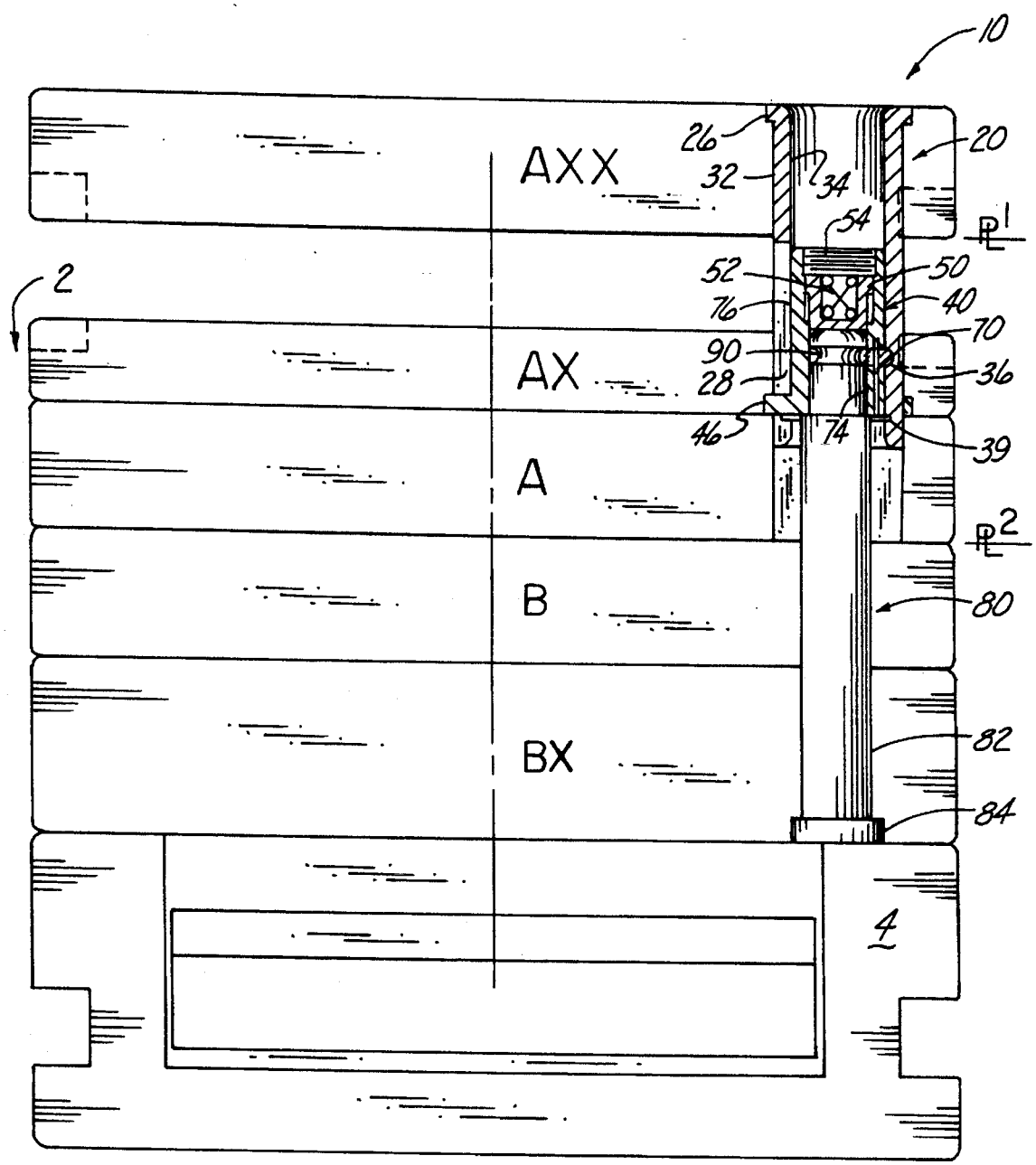
FIG. 2 is a sectional view similar to FIG. 1, but showing the mold open at the first parting line where the outer and intermediate plates are spaced apart by a predetermined distance and the intermediate and inner plates are positively locked together.

FIG. 2 shows the mold (2) opening at the first parting line—the contacting surfaces of the outer plate (AXX) and the intermediate plate (A-AX). The cam retainer (40) moves toward the full open position defined by the position of the snap ring (39). The predetermined spaced distance between the outer plate (AXX) and the intermediate plate (A-AX) can be set by the mold maker by using a travel bushing (20) of the appropriate length. At the predetermined spaced distance, the cam finger (70) is aligned with the undercut area (36) in the internal wall (34) of the travel bushing (20). The cam finger (70) is now able to disengage from the travel pin (80) and engage the travel bushing (20).

Figure 3:
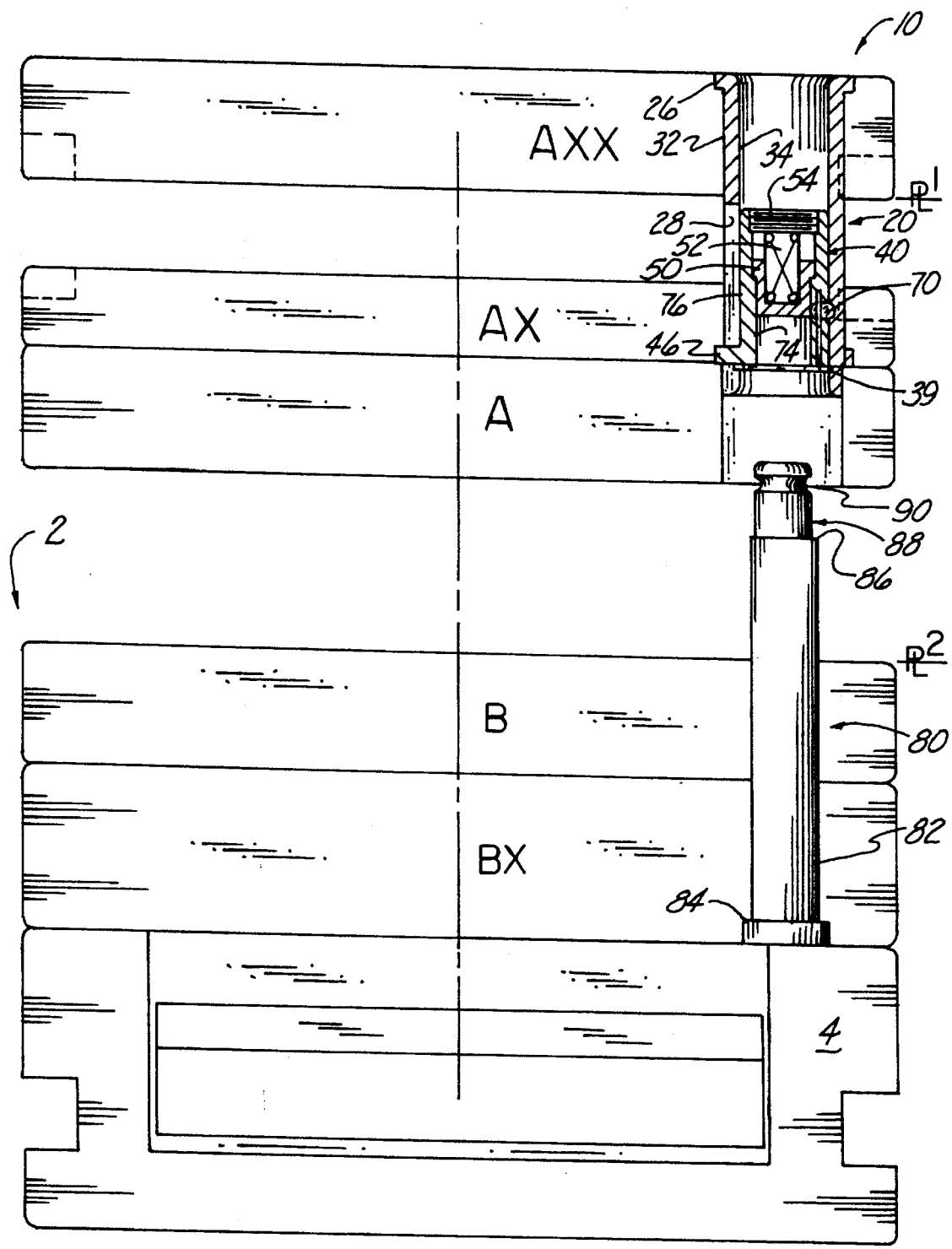
FIG. 3 is a sectional view similar to FIGS. 1 and 2, but showing the mold open at both the first and second parting lines.

FIG. 3 shows the cam finger (70) engaging the travel bushing (20). Since the travel pin (80) is retracted from the cam retainer (40), the spring retainer (50) is allowed to move down to contact one end of the cam finger (70) thus preventing the other end from disengaging from the undercut area (36) in the travel bushing (20). This locks the outer plate (AXX) and intermediate plate (A-AX) in spaced relationship at the predetermined distance. As the travel pin (80) is retracted, the mold (2) opens at the second parting line-the contacting surfaces between the intermediate plate (A-AX) and the inner plate (B-BX). The mold (2) is now fully open.

Figure 4:
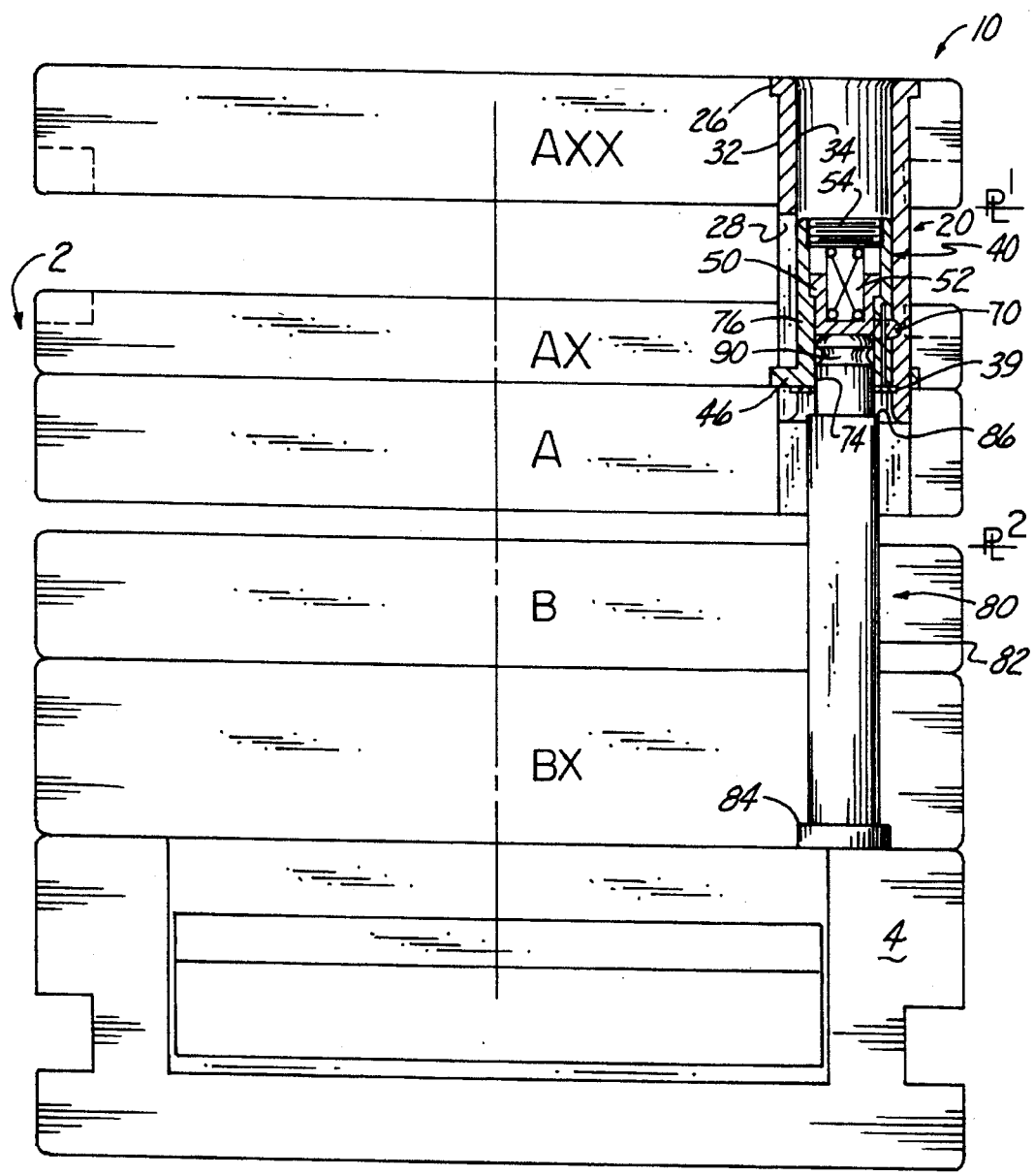
FIG. 4 is a sectional view similar to FIG. 3, but showing the mold in the process of being closed at the second parting line.

FIG. 4 illustrates the mold (2) in the process of being closed at the second parting line. The free end (88) of the travel pin (80) contacts the spring retainer (50) and pushes it up (FIG. 5) out of contact with the cam finger (70).

Figure 5:
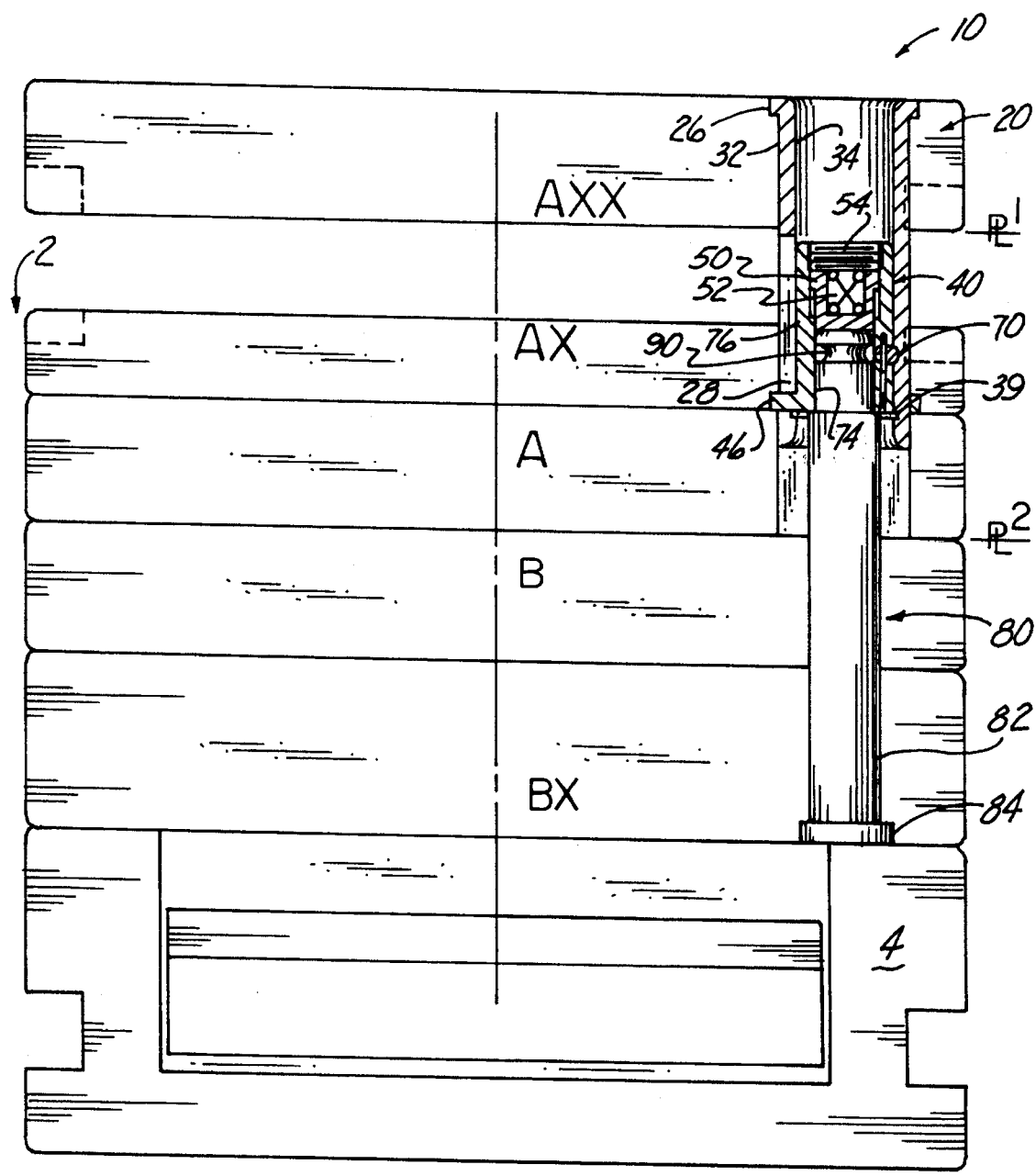
FIG. 5 is a sectional view similar to FIG. 4, but showing the mold closed at the second parting line where the spring is compressed by the travel pin, and the undercut in the travel pin is positioned to receive the cam finger and lock the intermediate and inner plates together.

FIG. 5 shows the travel pin (80) fully inserted in the cam retainer (40) and positioned so that the cam finger (70) is aligned with the undercut (90). The mold (2) is now closed at the second parting line. As the mold is moved to close it at the first parting line, the cam finger (70) will engage the undercut (90) and lock the intermediate plate (A-AX) and the inner plate (B-BX) together.

Thus, it can be seen that at least all of the stated objects have been achieved.

Obviously, many modifications and variations of the present invention are possible in light of the above teachings. It is therefore to be understood that, within the scope of the appended claims, the invention may be practiced otherwise than an specifically described.

I claim:

1. A positive internal latch lock for an injection mold having an outer plate, an intermediate plate and an inner plate, the plates being selectively movable between a closed mold position and a open mold position, a first parting line disposed at contacting surfaces of the outer plate and the intermediate plate, and a second parting line disposed at contacting surfaces of the intermediate plate and the inner plate, the latch lock comprising:

means for securing the outer and intermediate plates at a predetermined spaced distance when the mold is opened at the first parting line, the securing means being disposed internally of the mold; and means for locking the intermediate and inner plates together until the outer and intermediate plates are secured at the predetermined spaced distance, the locking means being disposed internally of the mold.

2. The latch lock of claim 1 wherein the securing means includes:

a travel bushing received within a bore in the outer and intermediate plates, and secured against movement with respect to the outer plate, the travel bushing including an internal cavity having an undercut area;

a cam retainer attached to and secured against movement with respect to the intermediate plate, the cam retainer being received in the internal cavity of the bushing and being selectively movable within the internal cavity between a retracted closed mold position and an extended open mold position, the cam retainer including an internal chamber;

a cam finger movable between the internal chamber of the cam retainer and the undercut area of the travel bushing; and spring retainer means disposed within the internal chamber of the cam retainer and movable between a compressed position and a released position for biasing the cam finger outwardly to engage the undercut area of the travel bushing when the cam retainer is moved to the extended open mold position.

3. The latch lock of claim 2 wherein the locking means includes:

a travel pin received within a bore in the inner plate and secured against movement with respect thereto, the travel pin including a free end selectively received within the internal chamber of the cam retainer, the free end being disposed to contact and hold the spring retainer means in the compressed position when the cam retainer is moved between the retracted closed mold position and the extended open mold position, the free end including an undercut area disposed to receive the cam finger when the free end holds the spring retainer in the compressed position, thereby locking the intermediate and inner plates together.

4. The latch lock of claim 2 further including cam retainer alignment means for aligning the cam finger with the undercut area in the travel bushing.

5. The latch lock of claim 4 wherein the travel bushing includes an annular groove spaced below the undercut area, and wherein the cam retainer alignment means includes a snap ring positioned in the annular groove and disposed to engage the cam retainer when it is moved to the extended open mold position.

6. The latch lock of claim 3 further including travel pin alignment means for aligning the cam finger with the undercut area in the travel pin.

7. The latch lock of claim 6 wherein the travel pin alignment means includes a shoulder spaced below the free end of the travel pin and disposed to engage a bottom portion of the cam retainer as it moves between the retracted closed mold position and the extended open mold position.

* * * * *